United States Patent [19]

Cardozo

[11] Patent Number: 4,738,045
[45] Date of Patent: Apr. 19, 1988

[54] COVER FOR DUCK BLIND

[76] Inventor: Douglas W. Cardozo, 3675 Happy Valley Rd., Santa Rosa, Calif. 95404

[21] Appl. No.: 86,369

[22] Filed: Aug. 17, 1987

[51] Int. Cl.$^4$ .............................................. A01M 31/02
[52] U.S. Cl. .................................................. 43/1
[58] Field of Search ........................................ 43/1

[56] References Cited

U.S. PATENT DOCUMENTS

| | | | |
|---|---|---|---|
| 3,848,352 | 11/1974 | Sayles | 43/1 |
| 3,886,678 | 6/1975 | Caccamo | 43/1 |
| 4,164,089 | 8/1979 | George | 43/1 |
| 4,483,090 | 11/1984 | Carper | 43/1 |

Primary Examiner—Gene P. Crosby
Attorney, Agent, or Firm—Larry D. Johnson

[57] ABSTRACT

The invention comprises a pair of vertically-opening door or panel members that are each hinged to a bracket member, and are attachable to the upper edge or rim of standard duck blind units, one on each side of the blind. Each panel includes a spring member extending generally perpendicularly across the hinge to the bracket, so that as the panels are closed horizontally over the blind, the spring is first stretched to a position of full extension, and is then slightly retracted, to enable the panel to stay in its down position. When the panels are contacted from below, as by a hunter standing erect within the blind, the panels are urged slightly upward, and the spring is thus stretched back into a position of full extension, and then past such full extension, causing the spring to then fully retract and move the panels about their hinges up and away from each other and the blind. After the hunter has fired, the panels can be manually returned to their down position, and the cycle repeated. The brackets are attached to the blind by an adjustable height support system comprising a universal clamp mechanism for secure attachment to the rim or lip of standard duck blinds, and a height-adjustable vertical support portion to enable selection of the height of the panels above the blind. This vertical support portion slidably engages the base of the brackets along a horizontal track, thereby enabling horizontal adjustment of the panels from the blind rim.

5 Claims, 4 Drawing Sheets

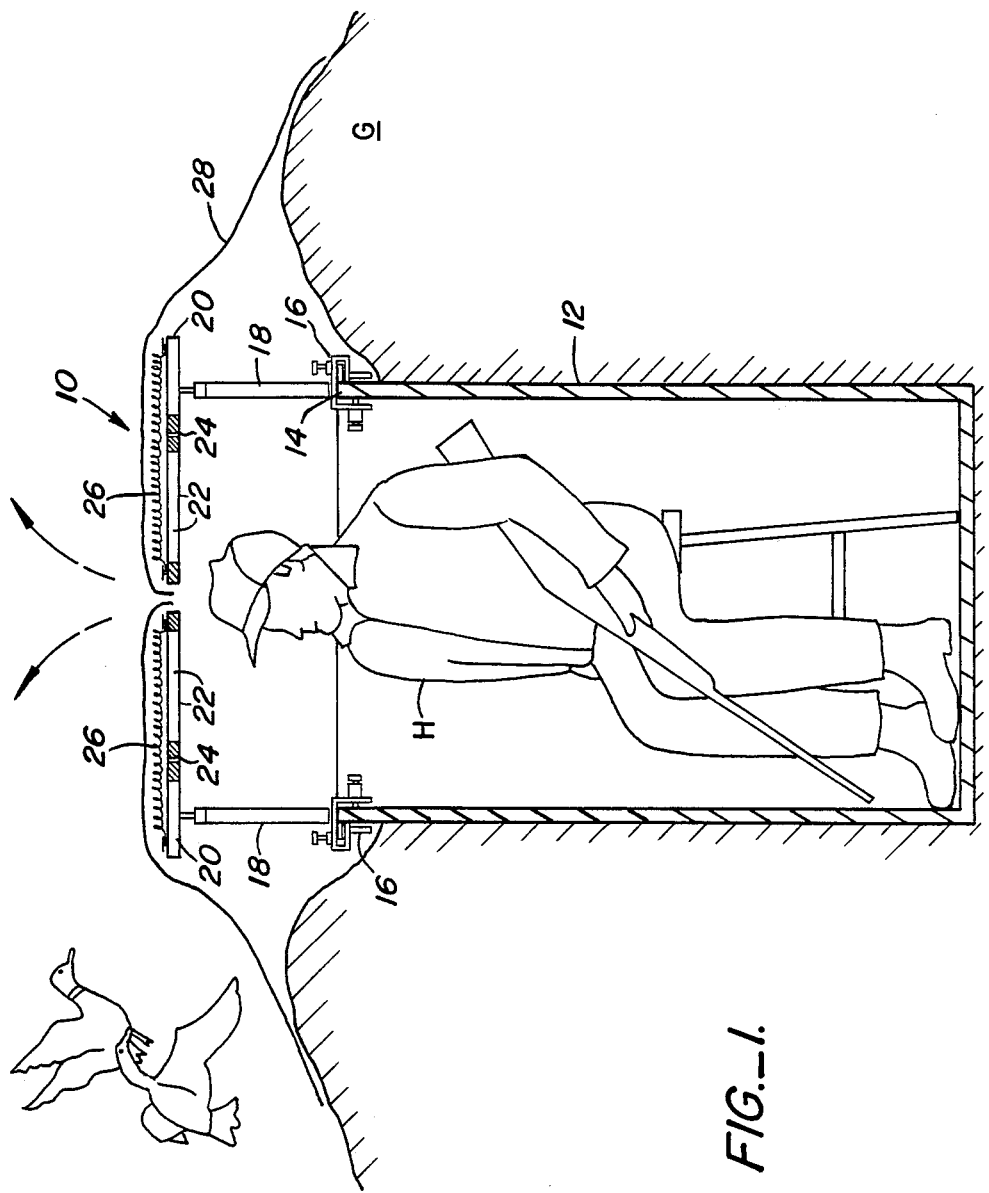
FIG._1.

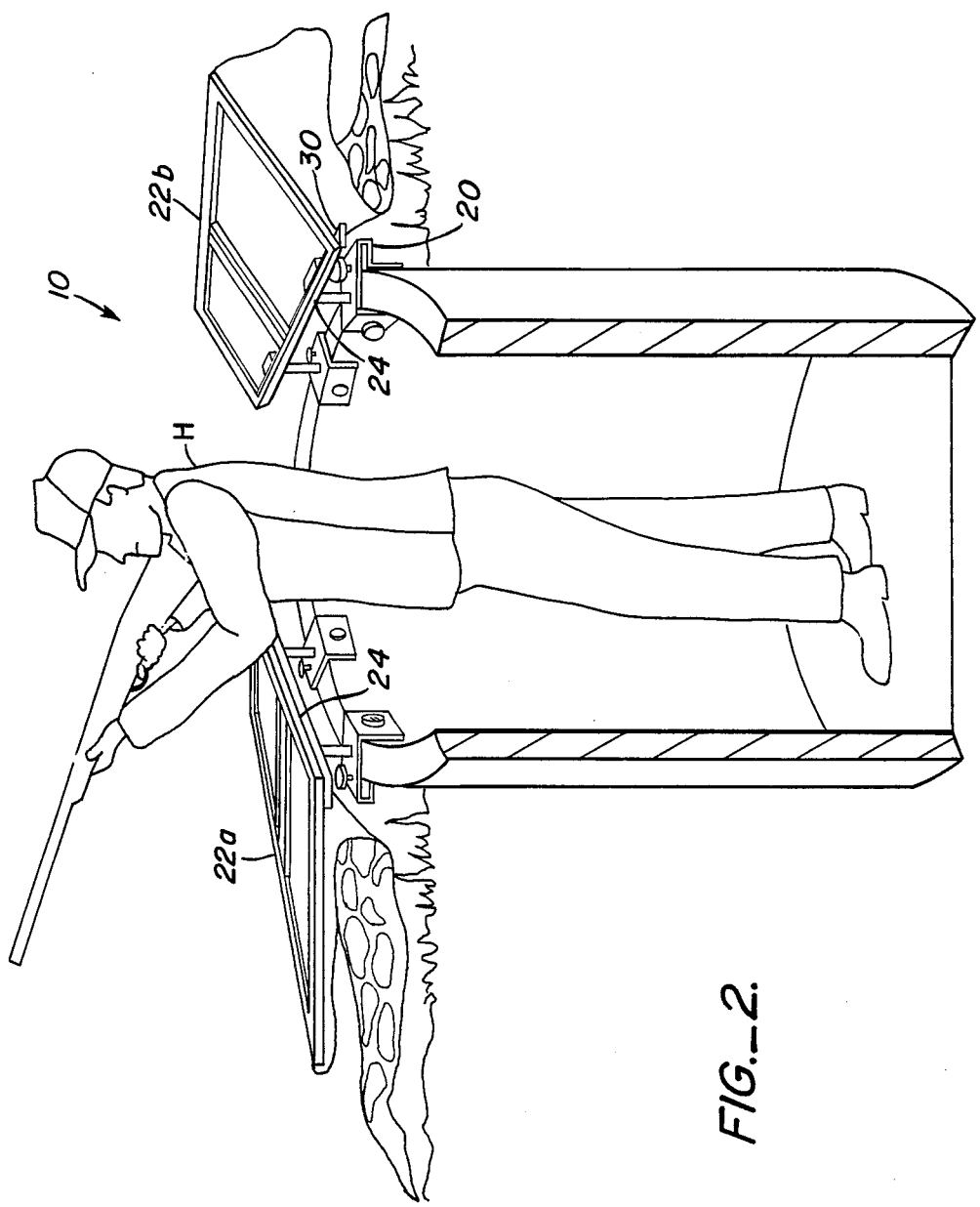
FIG._2.

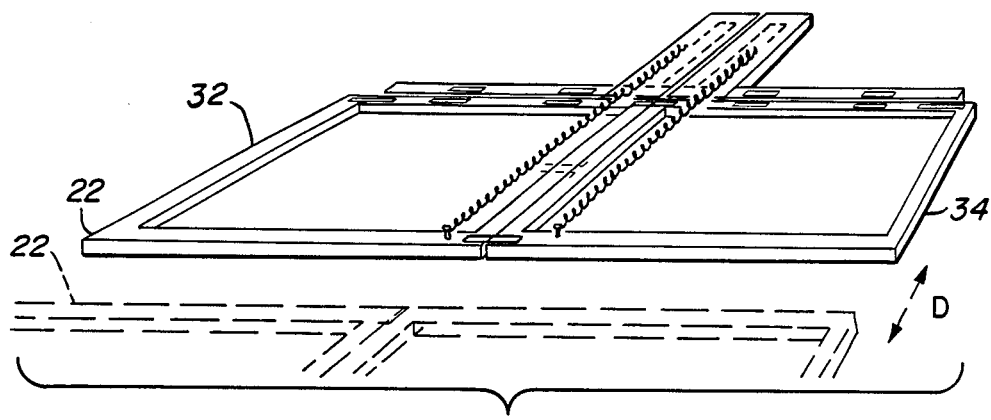
FIG._3.
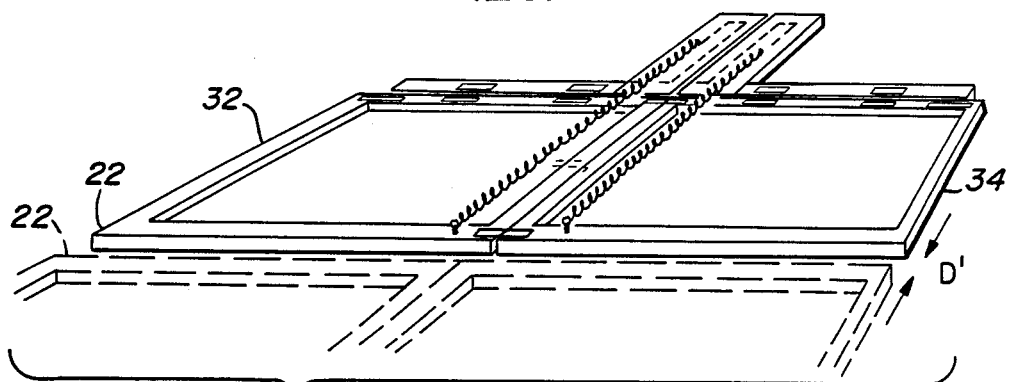
FIG._3A.
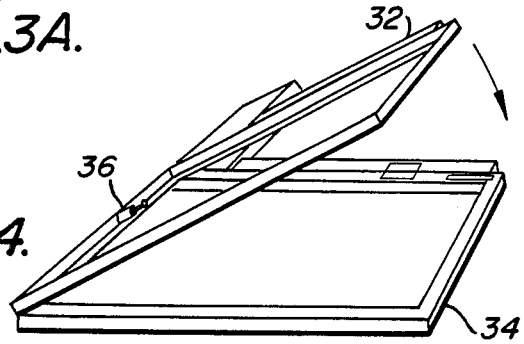
FIG._4.
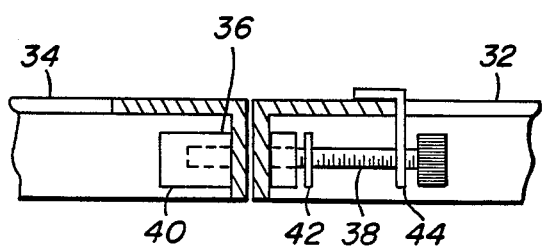
FIG._5.

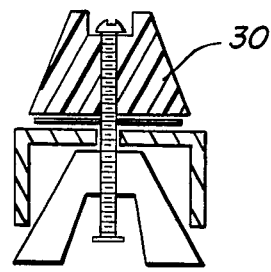
FIG._6.
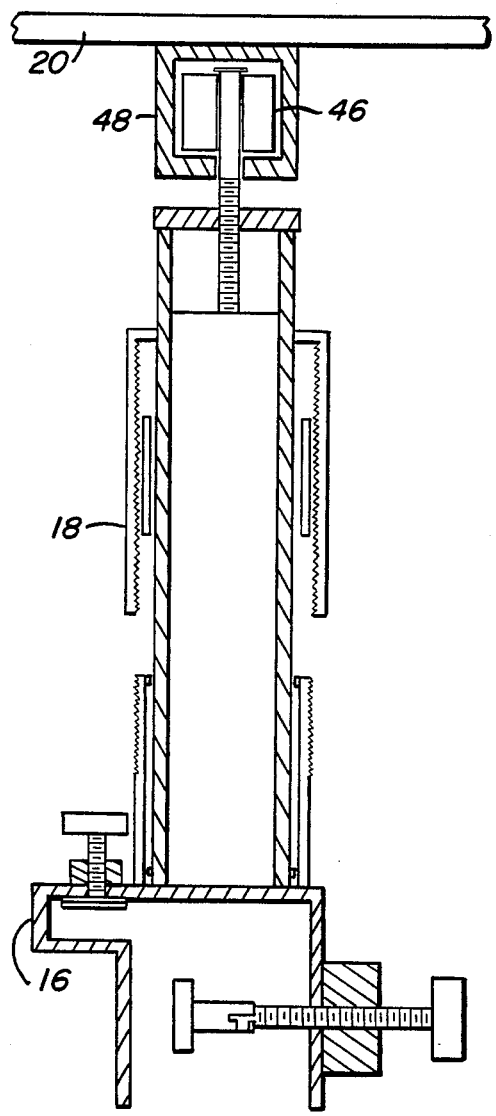
FIG._7.
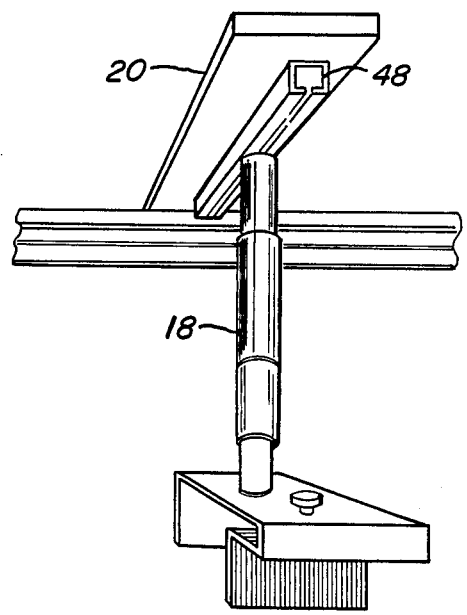
FIG._8.

COVER FOR DUCK BLIND

BACKGROUND OF THE INVENTION

1. Field of the Invention

This invention relates generally to an apparatus used for hunting and other outdoor activities, and more specifically to an improved cover for a hunter's blind.

2. Description of the Prior Art

Duck and goose hunting have long been popular sports. Most successful duck hunting requires the use of some sort of blind or other camouflage technique to prevent the ducks or other game from seeing, and then avoiding, the hunter. Typically, such a blind consists of a hollow box or cylinder of a size to accommodate at least one hunter and his equipment, and is at least partially buried in the ground and covered by brush, camouflage netting, or the like. The hunter must wait inside the blind until the ducks are spotted, and then remove the covering from the blind to be able to shoot. Previous duck blind covers have thus been awkward and inefficient, and are not readily transportable or transferable from one blind to another.

SUMMARY OF THE INVENTION

The cover for duck blind of this invention comprises a pair of vertically-opening door or panel members that are each hinged to a bracket member, and are attachable to the upper edge or rim of standard duck blind units, one on each side of the blind. The panels comprise generally rectangular frame portions which can be covered with see-through camouflage material or other suitable covering, so that when the panels are in their closed position over the blind, they form a generally horizontal planar covering to conceal the hunter from overflying ducks or geese. Each panel includes a spring member extending generally perpendicularly across the hinge to the bracket, so that as the panels are closed horizontally over the blind, the spring is first stretched to a position of full extension, and then slightly retracted, to enable the panel to stay in its down position. When the panels are contacted from below, as by the hunter standing erect within the blind, the panels are urged slightly upward, and the spring is thus stretched back into a position of full extension, and then past such full extension, causing the spring to then fully retract and move the panels about their hinges up and away from each other and the blind. After the hunter has fired, the panels can be manually returned to their down position, and the cycle repeated. An adjustable stop member is slidable between the panel and bracket to selectively restrict the amount of panel opening, as in the case of two independent duck blinds being in close proximity to one another, preventing full opening of the panels.

The brackets and panels are attached to the blind by an adjustable vertical height support system. This system comprises a universal clamp mechanism for secure attachment to the rim or lip of standard duck blinds, and a telescoping or other height-adjustable vertical support portion to enable election of the height of the panels above the blind. This feature is desirable in that it enables the panels to be adjusted to the height of the hunter, as well as allowing horizontal visibility beneath the panels. This vertical support portion slidably engages the base of the brackets along a horizontal track, thereby enabling horizontal adjustment of the panels from the blind rim. This horizontal adjustment can be made either fore-and-aft, or right-and-left, depending upon the orientation of the horizontal track relative to the base of the brackets. This feature yields two distinct benefits. First, the panels can thus be attached to almost any size or radius blind (rectangular, circular, or other configuration), and laterally adjusted to still provide the desired "pop-up" feature. In addition, the panels can be intentionally spaced apart to provide a visual gap in the blind covering for enhanced viewing by the hunter.

The vertical supports are detachable from the panels and brackets to facilitate transportation and storage. In addition, the panels themselves can be hinged into two (or more) sub-panels, engageable with a locking mechanism to secure them in coplanar arrangement, further enhancing the compaction of the device for transportation.

BRIEF DESCRIPTION OF THE DRAWINGS

FIG. 1 is a cross-sectional view of a cover for duck blind of this invention installed and in place over a typical duck blind, the cover being shown in its fully closed (down) position;

FIG. 2 is a partially cutaway perspective view of a cover for duck blind of this invention in its open (up) position, thereby enabling the hunter to shoot;

FIG. 3 is a perspective view of a pair of panel members of the cover for duck blind, adjusted to a given separation distance between the panels;

FIG. 3a is a perspective view of a pair of panel members of the cover for duck blind, adjusted to a lesser separation distance between the panels than that shown in FIG. 3;

FIG. 4 is a perspective view of two sub- or half-panels of a panel member being folded together into a storage/transportation configuration;

FIG. 5 is a partially cutaway side view of a sub- or half-panel locking mechanism used to lock the two sub- or half-panels of a panel member in coplanar arrangement;

FIG. 6 is a cross-sectional view of a panel stop member used to prevent full opening of a panel;

FIG. 7 is a cross-sectional view of an adjustable height support and blind clamp portion of the cover for duck blind; and FIG. 8 is a perspective view of an adjustable height support as installed beneath a panel member bracket.

DETAILED DESCRIPTION OF A PREFERRED EMBODIMENT

FIG. 1 is a cross-sectional view of a cover for duck blind 10 of this invention installed and in place over a typical duck blind 12, the cover being shown in its fully closed (down) position. The illustrated blind is a common "Smitty" type of blind comprising a large, buried cylinder with an upper circular edge 14. Cover 10 includes at least one universal clamp member 16 which is secured to edge 14. Above each clamp is an adjustable height support member 18, used to raise or lower the height of brackets 20. Panel members 22 are hingedly connected to brackets 20 by hinges 24, and springs 26 extend from bracket 20 to the edge of panel 22. Sheets of camouflage netting 28 can be draped over the entire apparatus, and on to the ground surface G, to lessen the visibility of the hunter H from the outside.

FIG. 2 is a partially cutaway perspective view of the cover for duck blind 10 in its open (up) position, thereby enabling hunter H to shoot. Here, the panel members 22a, 22b have been opened by the action of the hunter standing up to shoot, and they have swung open about hinges 24. Panel 22a has fully opened, while panel 22b has only partially opened due to the placement of adjustable stop member 30 between bracket 20 and panel 22b.

FIG. 3 is a perspective view of a pair of panel members 22 of the cover for duck blind, adjusted to a given separation distance D between the panels. This view also illustrates a preferred version of the invention, in which each panel is divided into sub-panels 32, 34 that hinge and lock together in place to form the full-size panel.

FIG. 3a is a perspective view of a pair of panel members of the cover for duck blind, adjusted to a lesser separation distance D' between the panels than that shown in FIG. 3. This adjustability is accomplished by the horizontal adjustment of the panels and brackets at their connection with the height support members, described infra.

FIG. 4 is a perspective view of the two sub- or half-panels 32, 34 of a panel member 22 being folded together into a storage/transportation configuration. Locking mechanism 36 releasably locks the half-panels together for installation in the field.

FIG. 5 is a partially cutaway side view of a sub- or half-panel locking mechanism 36 used to lock the two sub- or half-panels of a panal member in coplanar arrangement. Bolt 38 extends into or out of nut 40 to lock the half-panels 32, 34 together. Washer 42, welded to bolt 38, prevents inadvertent extraction of the bolt past flange 44.

FIG. 6 is a cross-sectional view of a panel stop member 30 used to prevent full opening of a panel. Stop member 30 simply slides between bracket 20 and panel 22 when only partial opening of the panel is desired.

FIG. 7 is a cross-sectional view of an adjustable height support 18 and blind clamp portion 16 of the cover for duck blind. Height support 18 can be a telescoping tube, modified screw, hydraulic lift, or any other type of length-adjustable device to vary the height of bracket 20 above clamp 16. In the preferred embodiment, the top of height support 18 comprises a sliding attachment 46 that slidably engages channel portion 48 attached to the bottom of bracket 20. This enables horizontal movement of the bracket, and thus the panel, relative to the height support and blind.

FIG. 8 is a perspective view of an adjustable height support 18 as installed beneath a panel member bracket 20. Channel portion 48 can of course be installed in any horizontal orientation to enable the desired horizontal adjustment (fore-and-aft, right-and-left, etc).

While this invention has been described in connection with preferred embodiments thereof, it is obvious that modifications and changes there may be made by those skilled in the art to which it pertains without departing from the spirit and scope of the invention. Accordingly, the scope of this invention is to be limited only by the appended claims.

What is claimed as invention is:

1. A cover for a duck blind having an upper rim comprising:
    at least one generally planar panel member having a first edge;
    a bracket member;
    hinge means connecting said panel member first edge to said bracket member, said hinge means enabling movement of said panel between an open position and a closed position relative to said blind;
    spring means connecting said panel and said bracket for opening said panel about said hinge when said panel member is contacted; and
    a vertical support member attached to said bracket member, said vertical support member conditioned for removable attachment to said blind upper rim.

2. The cover for duck blind of claim 1 wherein said vertical support member is adjustable in height.

3. The cover for duck blind of claim 1 including means for horizontal adjustment of said bracket member relative to said vertical support member.

4. The cover for duck blind of claim 1 including adjustable stop means for limiting said panel movement.

5. The cover for duck blind of claim 1 wherein said panel member is divided into sub-panels, and including a locking mechanism to engage said sub-panels together.

* * * * *